Patented Feb. 20, 1951

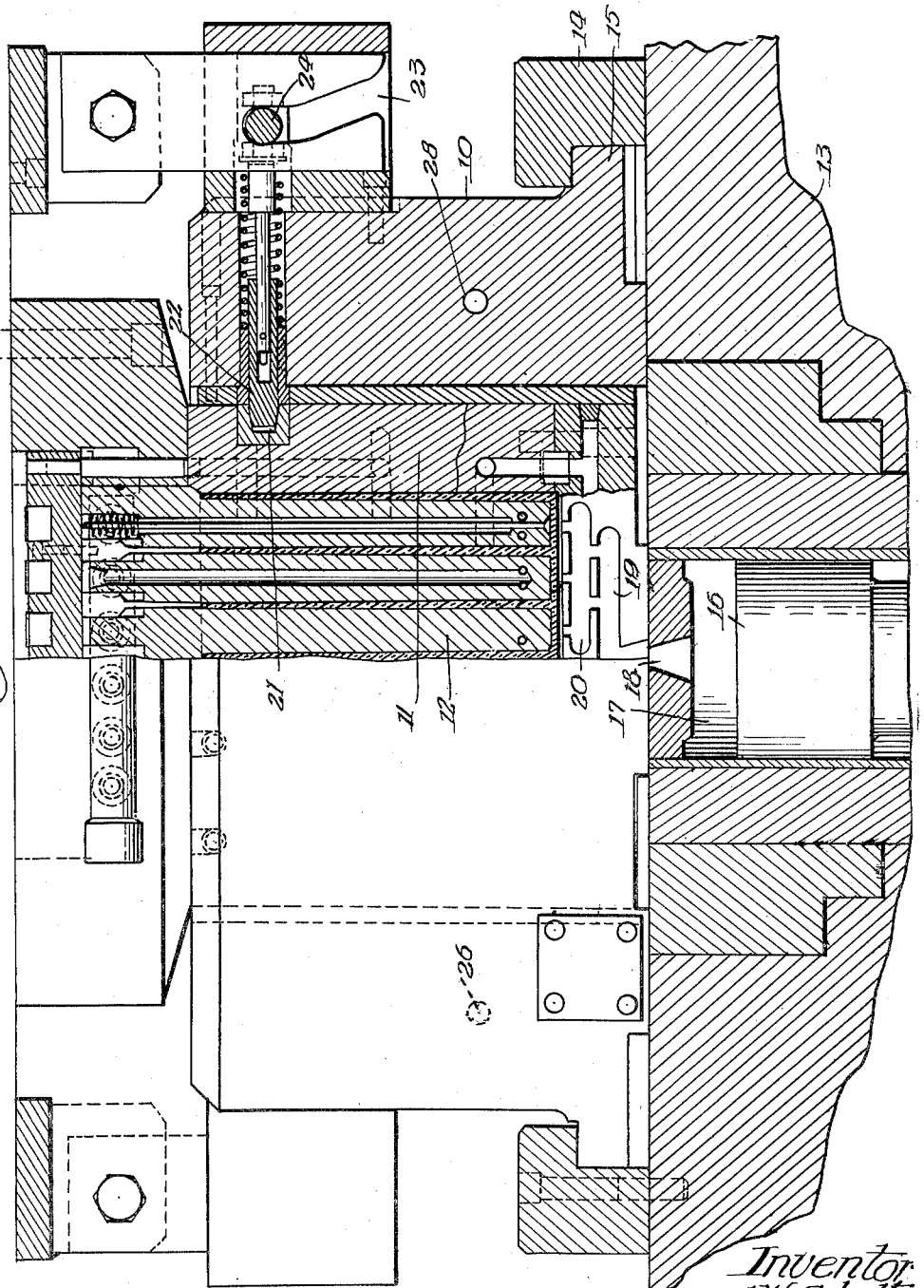

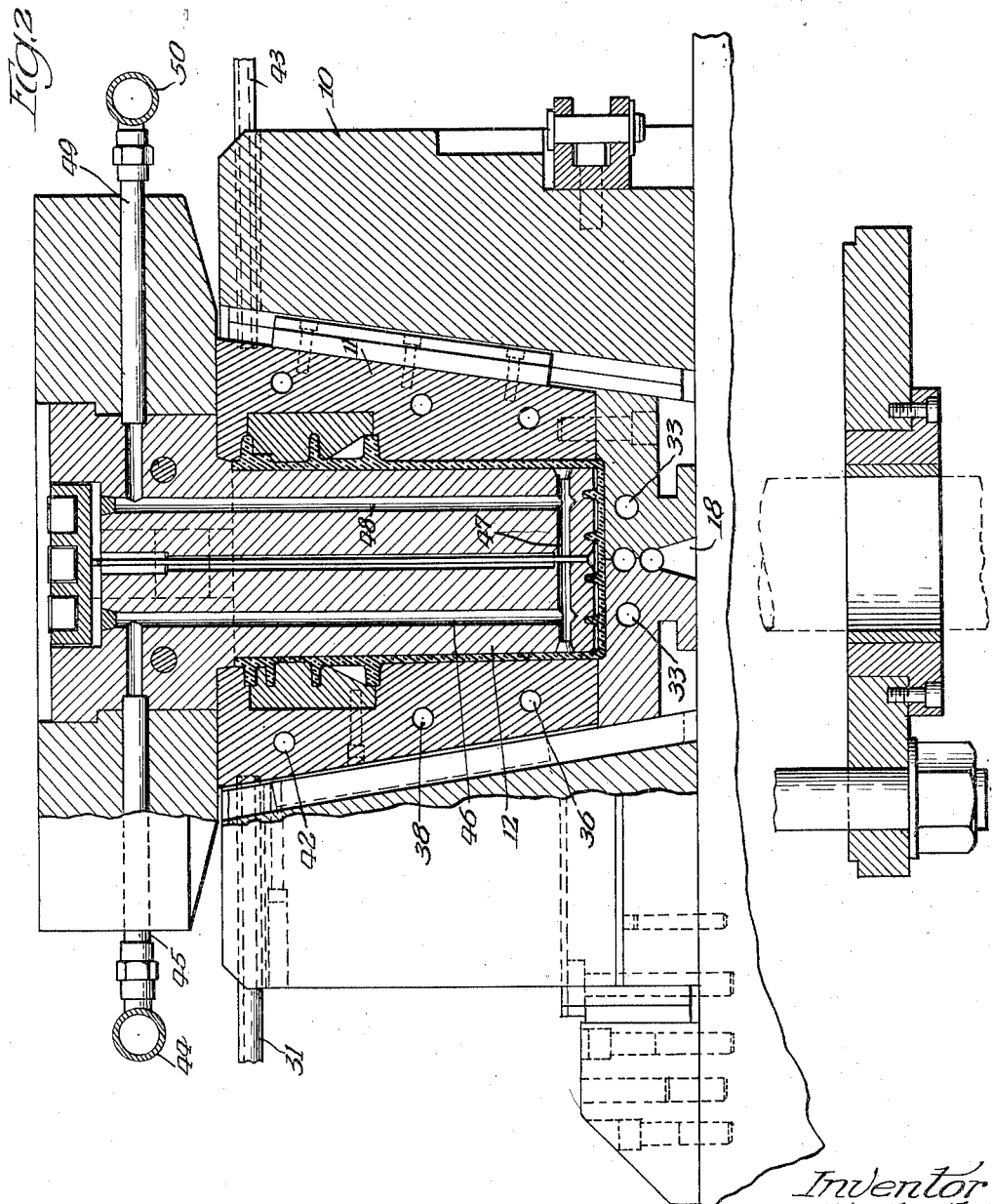

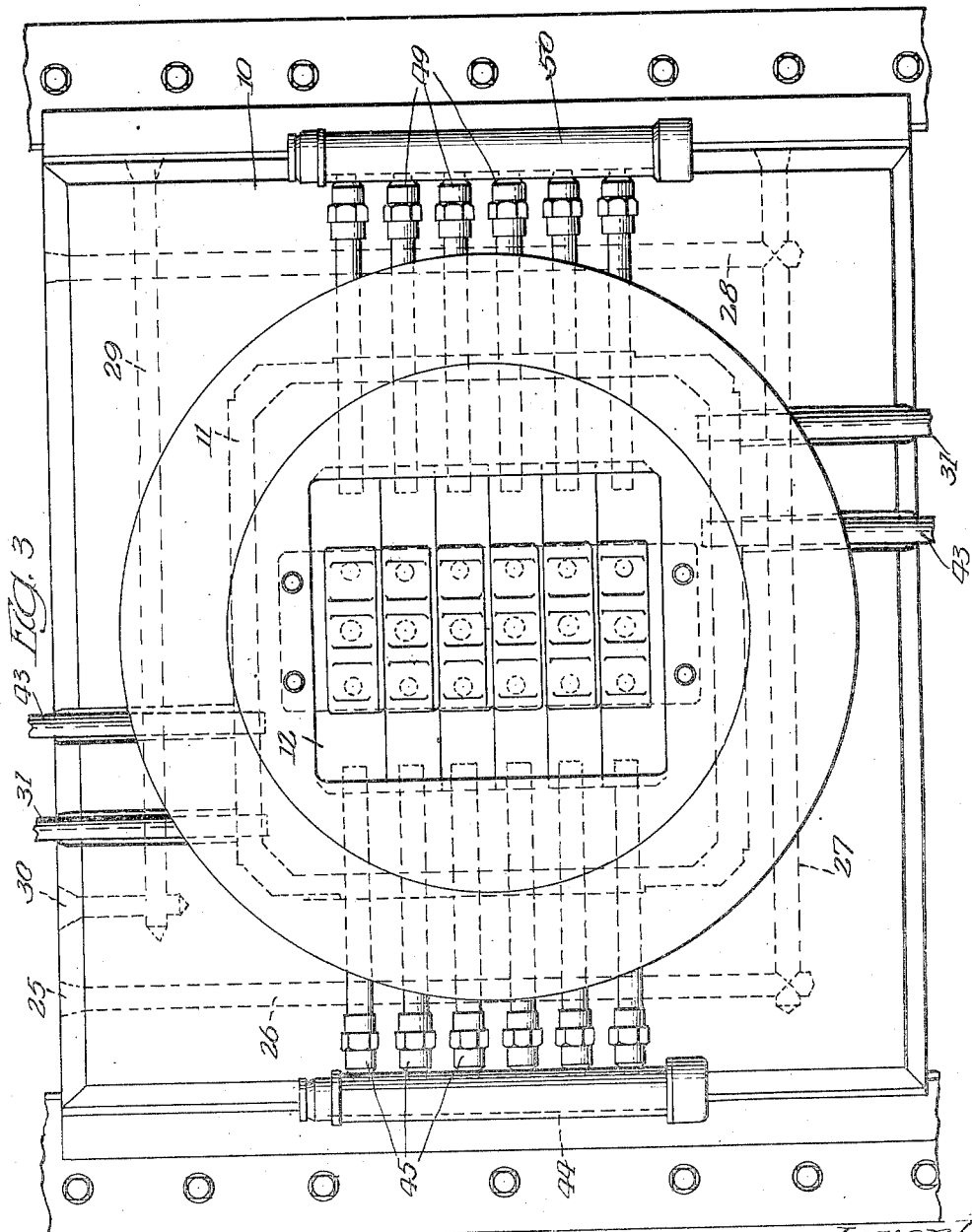

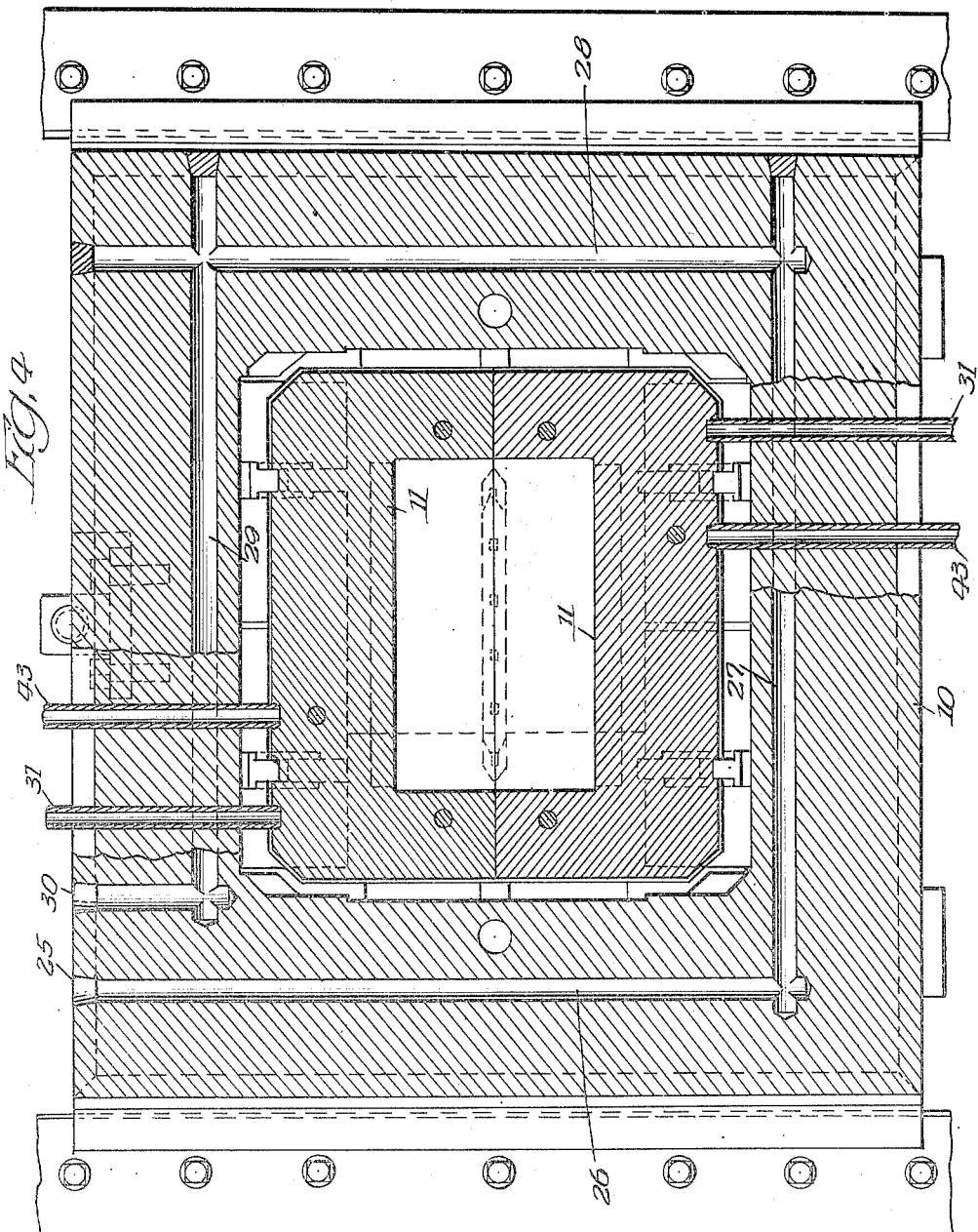

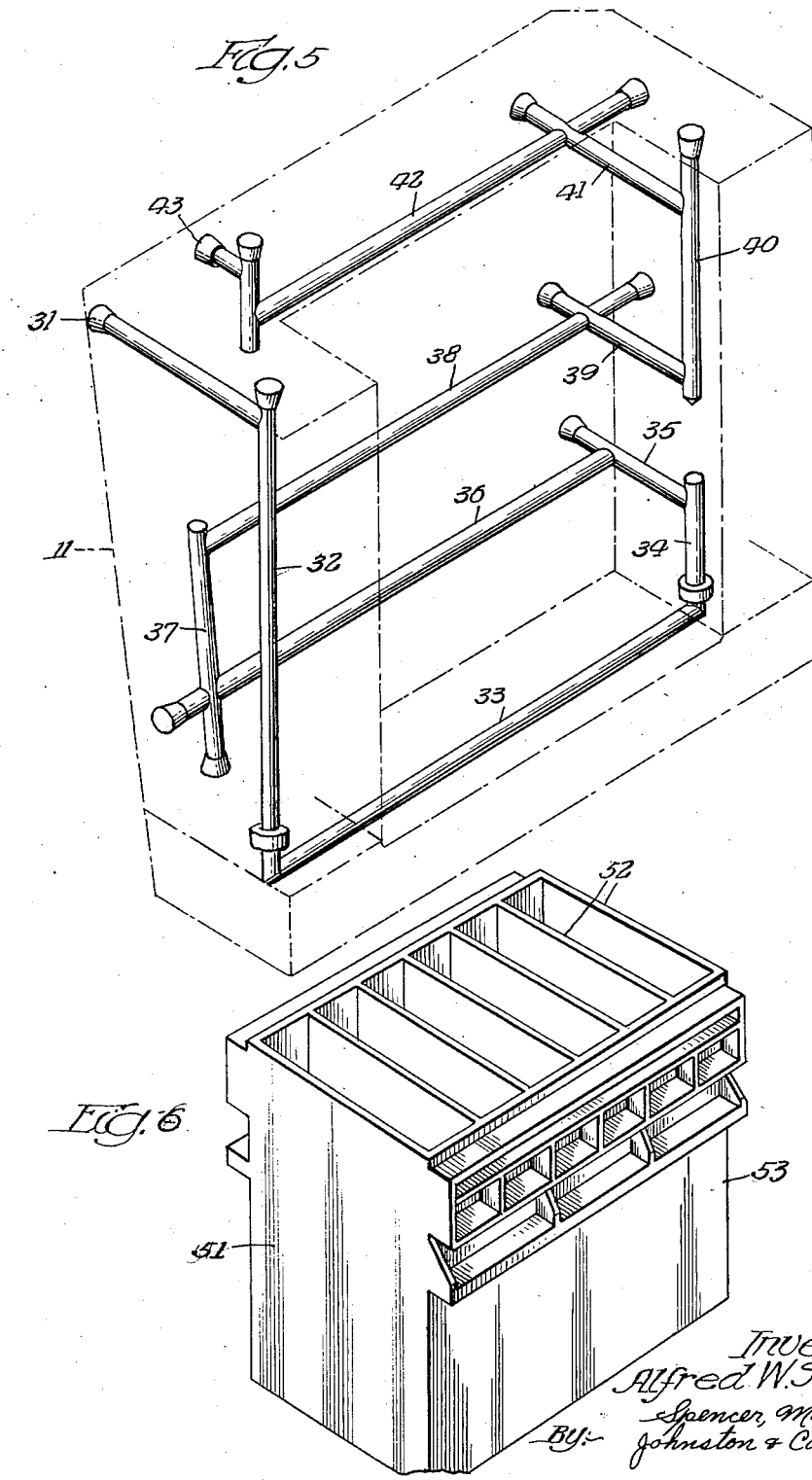

2,542,263

UNITED STATES PATENT OFFICE 2,542,263

PLASTIC MOLDING

Alfred W. Schultz, Chicago, Ill., assignor to Clearing Machine Corporation, Chicago, Ill., a corporation of Illinois Application January 31, 1947, Serial No. 725,516

4 Claims. (Cl. 18—55)

This invention relates in general to plastic molding and is particularly directed to a novel method whereby the temperature of a mold is effectively controlled to prevent the formation of flaws, such as bubbles, cracks, cones, strata and the like in the finished molded product.

While the machine illustrated herein can be used for the molding of thermosetting materials, the invention is directed more to the molding of thermoplastics where it is important that the cooling temperatures of the mold be controlled. In the molding of thermosetting materials, such as phenol formaldehyde and urea formaldehyde, the temperatures remain fixed, but in the molding of thermoplastics, the mold must be cooled and it is primarily the control of these cooling temperatures to which the present invention is directed.

It is a well known fact in the molding art that one of the most vexing problems particularly with respect to heavy section moldings, is the prevention of the formation of flaws in the final molded product. As a matter of fact, the trade has become so accustomed to these flaws that some users have set forth specifications limiting the size of the bubbles and the maximum length of cracks or crazes.

There are various types of molding processes carried out at the present time including compression molding, injection molding and transfer molding. Compression molding is a comparatively slow process although it is still the most practical for certain types of articles and plastics. Injection and transfer molding processes are fast becoming more popular because of the speed with which the products can be made.

The greatest difficulties appear when an article to be molded includes both thin walls and thick sections, particularly where thin and thick walls or sections are joined together. There is a tendency for the thinner walls to cool more quickly than the thicker walls, and pressure can not usually be maintained because the material is forced into a relatively cool, closed mold and the outer sides of the wall cool first leaving the center thereof still in a plastic state, whereupon bubbles form. Furthermore, the material may not reach to all points in the mold before becoming set, in which event a joint might not be made between the thin and thick wall sections.

In the present invention these various disadvantages of present day molding have been overcome and it is one of the principal objects of this invention to provide a method of molding a thermoplastic material which will effectively prevent the formation of bubbles, cracks, cones, strata and the like in the finished product.

Another object is to provide a method of molding a thermoplastic material wherein the cooling of the mold is effectively controlled to prevent the formation of flaws in the finished product.

A further object is to provide a method of molding a thermoplastic material wherein the mold is preheated to a temperature below the molding temperature of the material and the cooling of the mold is controlled while the pressure is maintained therein, whereby the molded article is uniformly cooled and the formation of flaws is thus effectively prevented.

Still another object is to provide a method of molding a thermoplastic material wherein a heated liquid is circulated through the mold for the purpose of preheating the mold to a temperature below the molding temperature of the material, and then circulating a cooler liquid in such a manner, while the material is still under pressure, as to cool the molded article uniformly, thus preventing the formation of flaws therein.

A still further and more specific object is to provide a method of molding either a high or low temperature thermoplastic material wherein the material is injected under pressure into a mold which has been preheated by circulating a heated liquid through the chase, cavity and force thereof, then maintaining the pressure until the hydrostatic conditions are substantially equalized throughout the entire mold, then uniformly cooling the molded article by first circulating a cooling liquid through the cavity and then the force, whereby the formation of flaws is effectively prevented.

Still another object is to provide a form of machine or mold for carrying out the method involved in the present invention.

Other objects and advantages of the invention will become apparent upon reading the following description taken in connection with the accompanying drawings in which:

Fig. 1 is a fragmentary front elevational view of the mold of the present invention with parts thereof in section to show details;

Fig. 2 is a vertical transverse sectional view through the mold shown in Fig. 1;

Fig. 3 is a top plan view of the mold showing more clearly the circulation channels of the force;

Fig. 4 is a horizontal sectional view through the mold showing some of the circulation channels in the chase;

Fig. 5 is a phantom view in perspective of one-half of the cavity showing the circulating channels therein; and Fig. 6 is a perspective view of an article formed of a thermoplastic and molded in the illustrated machine.

While the invention herein will be described in general as relating to any type of molded article, for purposes of illustration only, the specific machine and object molded thereby as shown in the drawings is a storage battery casing. The machine can be modified for the production of any other suitable type of article without in any way changing the method involved.

As stated hereinabove, the invention is particularly applicable for use in molding thermoplastic materials which include either high temperature thermoplastic materials such as methyl-methacrylite resin (Lucite) and polystyrene, or low temperature thermoplastic materials such as cellulose acetate. The only difference in the method of molding these two types of materials is in the temperature ranges involved, the temperatures of the circulating liquids for preheating as well as cooling the mold being within a higher range for the high temperature thermoplastics than those which would be used for molding the low temperature materials.

It is important that the temperatures of the mold, both during the preheating and the cooling thereof, be restricted to within predetermined temperature ranges. The thermoplastic material may be heated to form a moldable mass prior to its injection into the mold and if the temperature of the mold is too high, thus heating the material to a still higher temperature, too much shrinkage may occur, thus producing a distortion or a deformation of the finished product. Likewise, if the mold is too cool, the material itself will cool and may tend to resist flow and stick or cling to the force and, in addition, the pressure on the material in the mold can not be maintained for a sufficient period of time to permit the hydrostatic conditions therein to become equalized.

The mold of the present invention involves the customary chase, cavity and force, wherein the force is inserted within the cavity and held in place while the material is being injected therein. It has been determined that a very effective way in which the temperatures of the mold can be controlled is by providing a plurality of channels in each of the chase, cavity and force, within which a liquid can be circulated at predetermined and controlled temperatures which will thus impart controlled temperatures in the mold. The invention is not limited to the use of any particular liquid, but it should be one which cools and heats quickly without changing its viscosity and which can be raised to a temperature of approximately 350° F. without boiling at atmospheric pressure. Among such liquids may be either glycerine or a glycol. These liquids, however, are comparatively costly and may increase the cost of manufacture and it has been determined that water under pressure and superheated is an effective heating and cooling medium. For example, water under approximately 175 pounds pressure can be superheated to a temperature of approximately 325° F. to 350° F.

In carrying out the molding process, I provide a machine which is similar to the well known injection type, or the process may be termed a modified form of the transfer molding process. In any event, the thermoplastic material may be heated until it forms a moldable mass, which, in the case of a high temperature thermoplastic material such as methyl-methacrylite resin, may be in the neighborhood of 400° F. to 410° F., and then placed in a cylinder where a plunger will force the material under pressure into the cavity where it will flow around the force and form the final article.

The machine illustrated herein comprises the usual chase 10, cavity 11 and force 12. The force as shown herein which is used particularly in the molding of the storage battery casing shown in Fig. 6 comprises a plurality of downwardly extending sections around which the thermoplastic flows to form partitions. The base 13 of the machine may have an upwardly extending rib 14 with an overhang thereon which bears downwardly against a flange 15 on the chase 10 to hold the mold in place.

A plunger 16 is actuated and reciprocated within the cylinder 17 either by mechanical or hydraulic means in order to force the material into the cavity under great pressure. The material is forced through the sprue 18 and into a channel 19, which in turn has a plurality of outlets into the channel 20, from which the material moves into the cavity.

The molding takes place while the mold is closed and any suitable or well known means may be utilized for maintaining the mold in closed position during the molding process. For example, a plurality of recesses 21 in the sides of the cavity may be adapted to receive locking plungers 22 which are caused to be actuated by means such as the cam slot 23 which moves the rod 24, to which the plungers are connected, inwardly and outwardly as it is lowered or elevated.

The general construction of the mold may be of any well known character, the invention herein relating more particularly to the means and method by which the temperature of the mold is controlled at all times to insure proper molding and cooling of the molded article to prevent the formation of flaws. The temperature of the chase 10 is controlled by providing therein a plurality of channels through which a heated liquid is adapted to be circulated. It will be obvious that the number and position of these channels may be varied to suit individual conditions, and for purposes of illustration, the channels of the chase shown herein constitute an inlet 25 at the back of the chase which directs the fluid into the channel 26 extending along and through one side thereof toward the front of the mold. This channel connects with another channel 27 extending across the front, which in turn connects with a third channel 28, which directs the fluid then to the channel 29 at the back of the mold to the outlet 30. This is illustrated more clearly in Fig. 4.

The heating and cooling fluids are circulated more thoroughly in the cavity and the force inasmuch as these parts of the mold are in direct contact with the material being molded and the temperature of these parts should be more accurately controlled. The arrangement of channels which has been found to be best suited in this particular instance as far as the cavity is concerned is clearly indicated by the phantom view of one-half of the cavity in Fig. 5. The inlet for the fluid is indicated at 31 near the top of the cavity and the fluid flowing therethrough is then directed downwardly at the inner side of the cavity by means of the channel 32. A conduit or channel 33 extends across and through the bottom of the cavity and connects the substantially vertical channel 32 with a short upwardly extending channel 34. From this point the fluid then continues through the channels 35, 36, 37, 38, 39, 40, 41 and 42 to the outlet 43 also adjacent the top of the cavity. Both halves of the cavity are substantially identical and where these channels are seen in the other views of the drawing, the corresponding channels are indicated by similar numerals.

Thus it will be seen that any fluid heated to a relatively high temperature which is caused to flow through the channel arrangement just described will heat the cavity to any desired predetermined temperature.

The channel arrangement of the force for circulating the temperature controlling fluid therethrough may be more clearly understood by viewing Figs. 2 and 3. As above mentioned, the particular mold illustrated has been used for the purpose of producing the storage battery casing shown in Fig. 6 and for this reason the force is composed of six separate sections between which the thermoplastic material may flow in the mold to produce the various partitions as shown. The circulation of fluid through the force described herein will be that arrangement which has been worked out for this particular item. Other items or objects may require a slightly different specific arrangement, but this may be easily accomplished without in any way departing from the spirit of the invention.

The circulation of the temperature controlling fluid may be initially through the inlet manifold 44 which has a battery of conduits 45 to direct the fluid to the individual sections constituting the force. From the conduits 45 the fluid will be caused to flow downwardly through the channels 46 at one side of the force, across the bottom thereof through the channels 47 and then upwardly at the opposite side of the force through channels 48 connected to the conduits 49 at the opposite side of the mold, thus carrying the fluid to the outlet manifold 50. Here again it will be evident that by controlling the temperature of the fluid being circulated through these channels, the temperature of the force can be accurately and effectively controlled.

While numerous specific arrangements can be arrived at for supplying the fluid or liquid to the various parts of the mold at predetermined temperatures, in the actual practice of the invention a central boiler has been utilized for superheating water under pressure to a temperature of approximately 330° F. This temperature, however, is not critical except between a certain range, but of course it can not be permitted to go much below 330° F. when thermoplastics of the high temperature type are being molded. For the low temperature thermoplastics, a lower boiler temperature might be permissible. Suitable conduits are utilized to carry the liquid from the boiler to the mold and a suitable valve arrangement may be utilized so that the flow of liquid into each of the chase, cavity and force can be individually controlled. A similar and separate arrangement may be used for the cooling liquid where the temperature thereof is maintained in the neighborhood of 180° F.

Since the force is smaller and tends to heat and cool faster than the other parts of the mold, the heating of the force is usually accomplished last when the mold is being heated; and when the mold is cooled, the force is also the last part through which the cooler liquid is circulated.

In discussing the temperature ranges it will be understood that such temperatures apply primarily to high temperature thermoplastic materials such as methyl-methacrylite resin and polystyrene. The general steps of the process, however, will be the same regardless of the type of thermoplastic used, and if it happens to be a low temperature material, then the temperature ranges will be understood to be lowered accordingly.

As stated above, in carrying out the process of the present invention, the mold should be preheated, and the chase in particular should have a temperature preferably within the range of from 270° F. to 290° F. The temperature of the chase remains substantially the same at all times during the molding process and none of the cooling fluid is circulated therethrough, the cooling being confined primarily to the cavity and force.

In the molding of high temperature materials, the cavity temperature may range from approximately 300° F. or 305° F. to about 315° F. or 320° F., the preferable range being from about 310° F. to 315° F. The cavity takes longer to heat for the preheating of the mold and the heated fluid is therefore circulated therethrough prior to the circulation thereof through the force.

The force is the last part of the mold to be heated because of the rapidity with which the temperature thereof can be raised. The temperature of the force may also be varied within certain limits from approximately 315° F. to 330 or 335° F., the preferable operating range being between 320 and 325° F. If the boiler temperature is maintained at about 330° F., the preferred ranges of temperatures to which the various parts of the mold are to be raised can be accomplished and effectively controlled. It may not be necessary to maintain the boiler temperature this high if a low temperature thermoplastic material is being molded. A suitable battery of thermocouples is utilized in the usual and well known manner for determining and controlling the temperatures.

The following is an example of a typical molding cycle which has been carried out by the machine illustrated in the drawings in the use of methyl-methacrylite resin for making the storage battery casing shown in Fig. 6. The mold was preheated so that the temperatures of the chase, cavity and force were within the preferred ranges as specified above. The material was heated to a temperature of about 400° F. at which time it reached a moldable state. The mold was closed and the material was inserted within the cylinder and a hydraulic pressure of about 1500 pounds per square inch was exerted by the piston or plunger within the cylinder to eject the material into the mold. Translated, this would indicate that the hydrostatic pressure on the material within the mold was approximately 11,000 pounds per square inch.

The time for injection consumed about one minute, after which the pressure within the mold was maintained while the material therein was allowed to set for about one full minute. This is the approximate time necessary in the molding of methyl-methacrylite resin for the hydrostatic conditions to be substantially equalized throughout the entire mold under a pressure of about 11,000 pounds per square inch. In the use of other materials this period of time might be different.

However, the material is allowed to set before the cooling fluid is circulated within the cavity and force. In the present example, cooling fluid having a temperature of about 180° F. was allowed to circulate within the cavity for six minutes. This reduced the temperature thereof to within the range of about 225° F. to 250° F. During this time the temperature of the force remained the same and when the temperature of the cavity reached a point within the range just specified, a cooling fluid was then circulated through the force simultaneously with the circulation thereof within the cavity for approximately two and one-half minutes, whereupon the temperature of the entire mold was reduced to below 230° F. but above 220° F.

At this time the mold was opened and the molded article was sufficiently cooled to be removed from the mold. It will be noted that the entire time consumed in the molding process was about ten and one-half minutes, including the one minute injection time, one minute for the setting of the material, six minutes for cooling the cavity down to a predetermined temperature, and two and one-half minutes more for cooling the cavity and force down to within the range of 220° F. to 230° F.

The article molded is indicated by the numeral 51 in Fig. 6 and in the carrying out of the method above described, no bubbles, cracks, cones or strata were formed in the finished product. This type of article is usually difficult to mold without the formation of such flaws because of the many relatively thin walls 52 which are connected to the thicker walls 53. The only ways the flaws in this type of article, or in any article where both thin walls and heavy sections are present, can be prevented is to cool the entire article at a uniform rate. This is accomplished in the present invention not only by reason of the novel cooling channels within the mold, but also because the mold can be preheated thus assuring flow of the material to all parts of the mold and permitting the operator of the mold to maintain the pressure on the material therein during the cooling operation. Heretofore the pressure could not be maintained, or the maintaining thereof would have no effect because the mold temperature could not be adequately controlled and the material would set too fast and the thinner walls would cool faster than the thick walls or heavier sections.

It has been determined that the molding pressure should be slightly lower if the material being molded is polystyrene, even though it is included as a high temperature thermoplastic material.

In the molding of cellulose acetate and other low temperature thermoplastic materials, the moldable state thereof is reached at a lower temperature, therefore the preheating temperature of the mold as well as the cooling temperature thereof will be relatively lower. The method used in each case, however, follows substantially the example given above.

From the foregoing description it will be evident that the process of molding as disclosed herein will result in an improved molded article and will effectively prevent the formation of any flaws therein. The machine illustrated herein for the carrying out of the method may obviously be modified to suit different conditions, such as the molding of different types of articles. For example, the molding of bowling balls has been carried out in accordance with the process disclosed herein but with the use of an entirely different specific type of machine as regards the construction of different parts of the mold such as the cavity, and the force was omitted entirely. It will also be understood that the method may be carried out without adhering strictly to the temperatures, pressures and steps described and without departing from the spirit of the invention, as long as such methods fall within the scope of the claims appended hereto.

Having thus described my invention what I claim as new and desire to secure by Letters Patent of the United States is:

1. The process of molding a thermoplastic material in a machine having a chase, a cavity and a force, which comprises the steps of heating the thermoplastic material to a moldable state, circulating a heated liquid through channels in each of said chase, cavity and force to elevate the temperature thereof to a predetermined point below the temperature of said material, injecting said material into the mold under pressure, circulating a liquid at a lower temperature through channels in said cavity to reduce the cavity temperature to a predetermined point, and then circulating a liquid also at a lower temperature through channels in said force to reduce the temperature thereof to a predetermined point, while maintaining the temperature of the heated liquid in the chase substantially constant, whereby the molded article will be uniformly cooled.

2. The process of molding a thermoplastic material which comprises the steps of preheating the chase, cavity and force of a mold to a predetermined temperature below the moldable temperature of the thermoplastic, injecting the thermoplastic into the closed mold under pressure, maintaining the pressure and temperature in the mold until the hydrostatic conditions in the mold until the hydrostatic conditions are substantially equalized throughout the entire mold, then circulating a cooling medium through channels in the cavity to reduce the temperature thereof a predetermined amount, and finally circulating a cooling medium through channels in the force, while maintaining the temperature of the chase substantially constant, whereby the molded article may be uniformly cooled.

3. The process of molding a thermoplastic material which comprises the steps of preheating the chase, cavity and force of a mold by circulating a heated fluid through channels therein to a predetermined temperature below the moldable temperature of the thermoplastic, injecting the thermoplastic into the closed mold under pressure, maintaining the pressure in the mold until the hydrostatic conditions are substantially equalized throughout the entire mold, and then uniformly cooling the molded article by circulating a cooling fluid at a lower temperature, first through the cavity and then through the force.

4. The process of molding a high temperature thermoplastic material which comprises the steps of circulating a heated fluid through channels in the chase, cavity and force of a mold to elevate the temperature of the chase to within the range of about 270° F. and 290° F., the cavity to within the range of about 305° F. and 320° F., and the force to within the range of about 315° F. and 335° F., injecting the material into the closed mold under pressure in a moldable state, maintaining the pressure in the mold until the hydrostatic conditions are substantially equalized throughout the entire mold, circulating a liquid at a lower temperature through the cavity until the cavity temperature is within the range of about 225° F. to 250° F., and then circulating a liquid at a lower temperature through the force until the temperature of the force and mold is within the range of about 220° F. and 230° F., to thereby uniformly cool the molded article.

ALFRED W. SCHULTZ.

REFERENCES CITED

The following references are of record in the file of this patent:

UNITED STATES PATENTS

| Number | Name | Date |
| --- | --- | --- |
| 791,648 | Richards | June 6, 1905 |
| 1,918,532 | Geyer | July 18, 1933 |
| 2,043,584 | Husted | June 9, 1936 |
| 2,160,108 | Reid | May 30, 1939 |
| 2,359,013 | Tucker | Sept. 26, 1944 |